A. J. KLONECK.
LANTERN LENS.
APPLICATION FILED JAN. 15, 1918.

1,407,427.

Patented Feb. 21, 1922.

WITNESS:

INVENTOR.
Austen J. Kloneck.

UNITED STATES PATENT OFFICE.

AUSTEN J. KLONECK, OF NEW YORK, N. Y.

LANTERN LENS.

1,407,427. Specification of Letters Patent. Patented Feb. 21, 1922.

Application filed January 15, 1918. Serial No. 211,965.

*To all whom it may concern:*

Be it known that I, AUSTEN J. KLONECK, a citizen of the United States, and a resident of New York, in the county and State of New York, have invented certain new and useful Improvements in Lantern Lenses, of which the following is a specification.

This invention relates to a glass or lens for lanterns and more particularly adapted for use in automobile headlights and for other purposes.

One object of the invention is to produce a lens with a suitable arrangement of prisms formed upon the surface thereof for the purpose of distributing a light through the same in certain directions without causing a glare of the light upon passersby.

A further object of the invention is to provide a lens with a plurality of differently colored portions which will cause a better penetration of damp air or fog by such light and will permit such light to be better distinguished in approaching vehicles.

These and other allied objects are attained by a novel combination and arrangement of recesses and colors upon the surface of the glass lens which will hereinafter be more particularly described and which are shown in the accompanying drawings forming a part of this specification.

Figure 1:
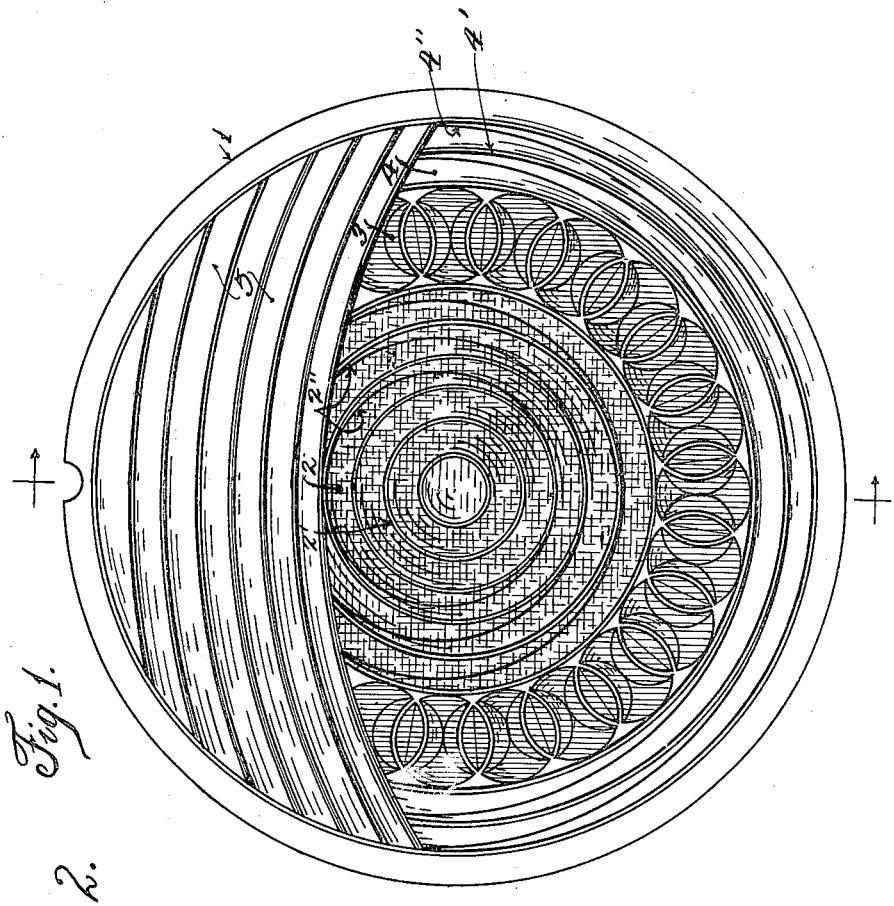
Figure 2:
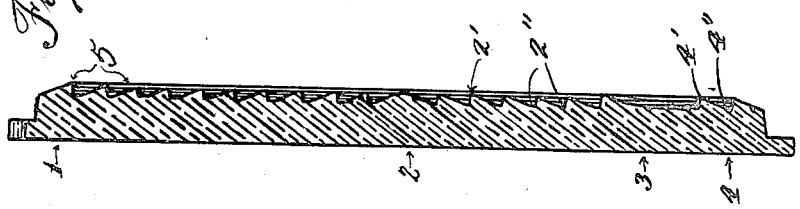

In reference to the drawing, the Figure 1 shows an elevational view of the preferred embodiment of my invention. Figure 2 shows a sectional view of the same.

It should be noted that the lens as illustrated may be employed two ways according to the desired main effect either with the part 5 as the top of the light or also as the bottom or lower part of the light.

Referring more particularly to the drawings in which similar characters of reference designate corresponding parts in the different views, the numeral 1 designates the base of the lens including a central part 2, an intermediate part 3, an outer part 4 and a sector part 5. The part 2 consists of circular prisms formed by projections 2' and grooves 2''. The part 3 of the lens consists of a partial ring shaped part comprising a plurality of small intersecting circular prisms. The part 4 consists of circular prisms similar to that of part 2 and which are formed by the projections 4' and the grooves 4''. The part 5 of the lens consists of a plurality of flat or arc shaped prisms occupying a sector shaped part of the lens.

It will, be noted that the grooves 2'' of part 2 and 4'' of part 4 are not parallel to the projections 2' or 4' respectively, thus although they form concentric prisms they distribute the light so as to direct a light straight forward upon the road but not sidewards. In the drawing the grooves 2'' and 4'' extend from one of the projections 2' and 4' to an adjacent one of said projections and thus modify the action of the concentric prisms therewith. The part 3 formed of intersecting prisms serves for producing a straying and glareless light for partially illuminating all directions. The part 5 serves for directing a light downward and sideward.

It will be clear from the foregoing that each of said parts has a definite function which thus permits a distribution of any part of the light rays for certain purposes, as desired.

I have also provided the lens with different colors such as the part 2 which is made yellow colored while the part 3 is made of a reddish color. The purpose of employing such differently colored lenses is to make a light more distinguishing and penetrating in damp weather than white light, which latter practically disappears as also does other single colored lights in a fog or damp air.

A glare of the light from the lens will be partially pervented by the coloring of the light and partially by the prisms which latter may be better if many and fine prisms constitute the lens rather than few and coarse prisms.

Having now fully described my invention what I claim as new and desire to secure by Letters Patent is:—

1. A lantern lens having a main part formed with circular prisms, an intermediate of said first part formed with small circular intersecting prisms and a segmental part having arc shaped prisms, all, for the purpose set forth.

2. A lantern lens comprising differently colored parts, the center part being yellow colored, the outermost part being white and uncolored, and an intermediate partly circular part between said mentioned center and outermost parts being differently colored with respect to said center part, adapted for producing a distinguished light for all weather conditions.

3. A lantern lens formed with a plurality of prisms adapted for projecting light rays in certain directions including a circular part having circular formed prisms for projecting light downward and straight forward, an intermediate circular part having prisms for straying diffused light in all directions, and another semicircular or segmental part having prisms adapted for projecting light flatly sideward.

4. In a lens, a part thereof formed with ring shaped prisms, another or a segmental part thereof formed with prisms of relatively large arcs, and a ring shaped part between said first mentioned prisms formed with a plurality of small circular prisms for the purposes set forth.

5. In a lens, a part thereof formed with ring shaped prisms, another part thereof formed with transversely extending prisms in a segment thereof, and a part between said ring shaped prisms formed with small circular prisms, the latter intersecting one another for the purpose set forth.

6. In a lens, a part thereof formed with ring shaped prisms, another part formed with relatively transverse prisms, and a ring part between said ring shaped prisms formed with a plurality of small intersecting circular prisms, said lens having a plurality of colors for the purposes set forth.

7. In a lens, a part thereof formed with ring shaped prisms, another part thereof formed with transversally extending prisms, and a part thereof formed with small circular prisms, certain of said prisms being differently colored said color comprising orange or reddish, for the purpose set forth.

8. In a lens, a part thereof formed with ring shaped prisms, another part thereof formed with arc shaped prisms, and a part thereof formed with small circular prisms, certain of said prisms being differently colored with respect to other prisms, said ring shaped prisms having a yellow color, all, for the purpose set forth.

9. In a lens, a part thereof formed of concentric prisms, a part formed with circular prisms and a part formed with tangential prisms, certain of said prisms being formed by grooves and projections in a manner whereby the grooves for the same traverse from each one of said projections to adjacent ones of said projections, all, for the purpose set forth.

In testimony whereof I hereunto subscribe my name to this specification in the presence of two witnesses.

AUSTEN J. KLONECK.

Witnesses:
CLARA BROWNER,
CHAS. H. MILTON.